Sept. 7, 1937.                 J. KOLBE                    2,092,676
                            MOTOR VEHICLE
                    Filed Oct. 14, 1935        4 Sheets-Sheet 1
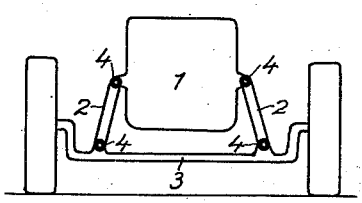
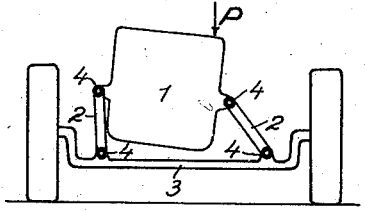
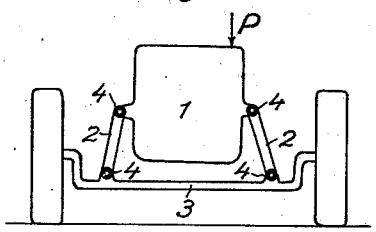
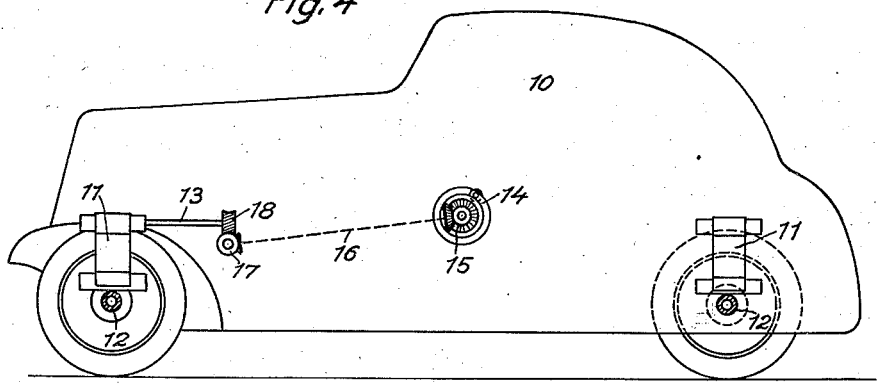
INVENTOR
Joachim Kolbe
BY
ATTORNEYS Sept. 7, 1937. J. KOLBE 2,092,676
MOTOR VEHICLE
Filed Oct. 14, 1935 4 Sheets-Sheet 2
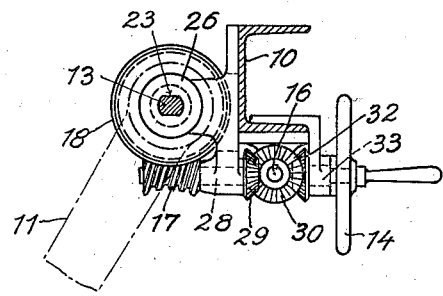
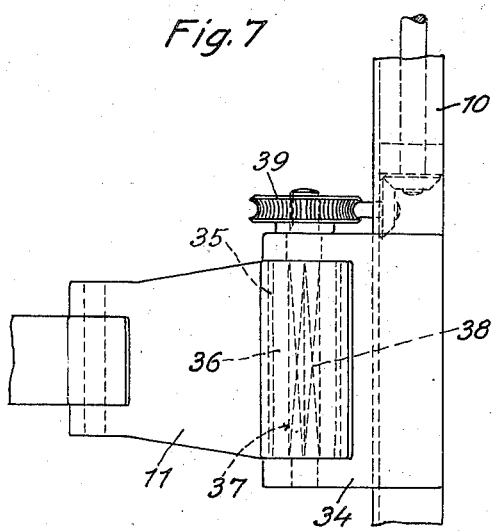
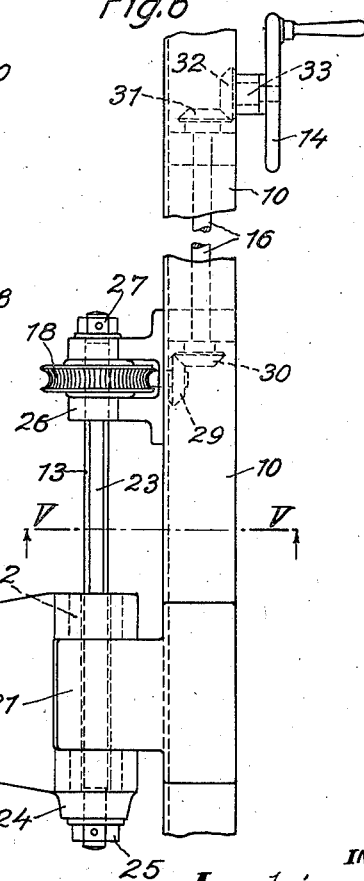
INVENTOR
Joachim Kolbe
BY
ATTORNEYS Sept. 7, 1937.      J. KOLBE      2,092,676
MOTOR VEHICLE
Filed Oct. 14, 1935      4 Sheets-Sheet 3

INVENTOR
Joachim Kolbe

BY Bryant & Locasy
ATTORNEYS

Sept. 7, 1937.　　　　J. KOLBE　　　　2,092,676
MOTOR VEHICLE
Filed Oct. 14, 1935　　　4 Sheets-Sheet 4
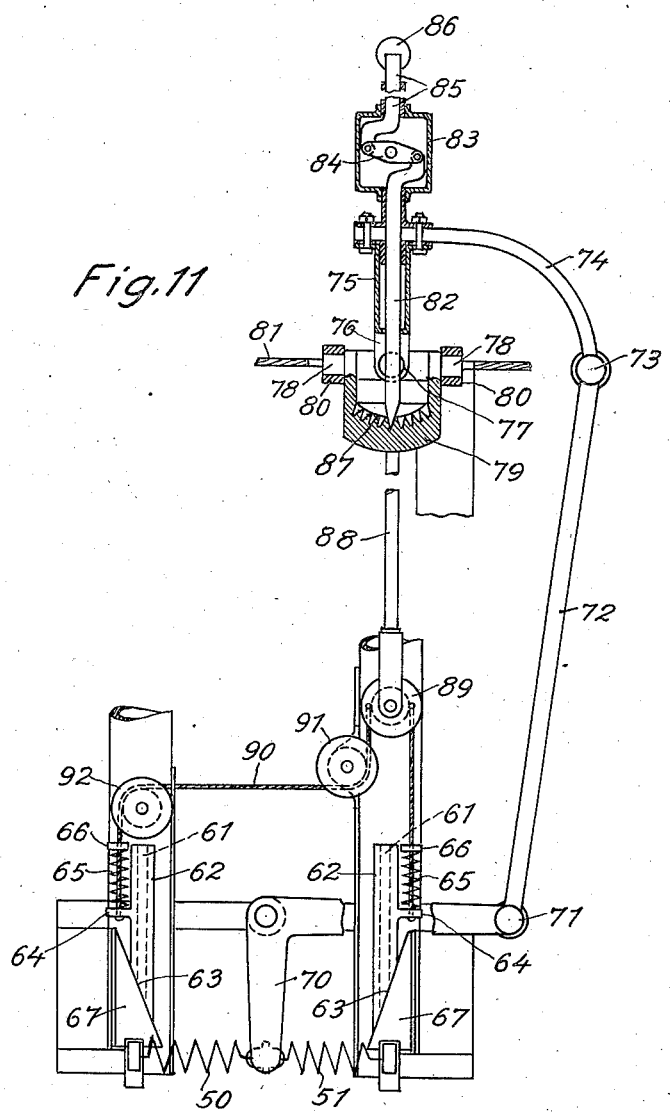
INVENTOR
Joachim Kolbe
BY Bryant & Lowry
ATTORNEYS Patented Sept. 7, 1937

2,092,676

UNITED STATES PATENT OFFICE 2,092,676

MOTOR VEHICLE

Joachim Kolbe, Hanover, Germany

Application October 14, 1935, Serial No. 44,978
In Germany October 15, 1934

8 Claims. (Cl. 280—112)

This invention relates to vehicles in which the carriage body is supported with respect to the under frame in such a way that under the influence of the centrifugal force when travelling on curves the carriage body may take up an inclined position so that the passengers do not notice this force. These vehicles will be named in the following as curve compensating vehicles.

The connection between the carriage body and the under frame which may also consist of separate axles carrying the wheels is constituted especially by means of connecting links which are connected at the one side with the carriage frame and at the other side with the underframe by means of joints the axes of which are parallel to the longitudinal axis of the vehicle. The distance of the joints at the carriage frame is less than the distance of the joints at the under frame. In these constructions between the carriage frame respectively the under frame springs are arranged which tend to maintain the normal position of the carriage body. For this purpose spiral springs can be used, arranged outside of the joints, or torsional systems constituted by torsional rods or torsional rubber springs may be arranged within the joints.

The main object of the invention consists in preventing the carriage body from taking an inclined position and maintaining this inclined position even when travelling on a straight road if the carriage body is subjected only at one side by a load. According to the invention means is provided which can be actuated from the interior of the vehicle, such as from the driver's seat, and which acts so that if loaded at one side the vehicle nevertheless will be prevented from taking an inclined position when at rest or when travelling on a straight road.

These means can be constructed and arranged especially so that they can act upon the springs named above. The driver may give on this way to one or the other of these springs a greater tension to counterbalance the one-side load by a corresponding counter-force, thus restoring the normal position of the carriage body. In this connection it is without importance whether the springs are arranged outside of or within the joints.

Further, according to the invention, a locking device may be provided alone or in connection with the means acting upon the springs. This device gives the possibility to lock the carriage body with respect to the under frame or to the links in every position so that the taking up of an inclined position may be prevented as well.

The same locking device may be used for limiting the inclination during the travelling on curves to a desired degree for all or for special times.

Further objects and features of the invention will become clear from the following description of the examples shown in the drawings.

Figs. 1 to 3 are showing schematically the influence of a one side load and the counterbalancing of this load as a result of the means according to the invention.

Fig. 4 shows schematically a side view of a curve compensating vehicle with the means for changing the tension of a spring arranged at the joint between one of the connecting links and the carriage body.

Fig. 5 shows the means for changing the tension of the spring in a greater scale and in a cross section according to V—V in Fig. 6.

Fig. 6 shows a plan view of Fig. 5.

Fig. 7 shows a plan view of a second construction.

Fig. 11 shows a construction in which the means for changing the spring-tension and the locking device are combined.

Figure 8:
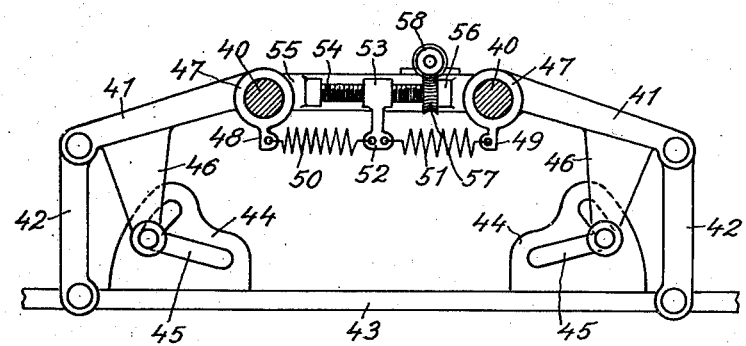
Fig. 8 shows schematically a third construction of an arrangement in a front view, the spring being arranged outside of the joints.

According to Fig. 1 the carriage body 1 is supported by the axles 3 of the vehicle by means of links 2. The connection is made by joints 4 the axes of which are parallel to the longitudinal axis of the vehicle, and springs are provided, which tend to hold the carriage body 1 in its normal position shown in Fig. 1, which springs may be arranged at the links 2 or within the joints 4.

If such a vehicle is loaded by a one side load as indicated in Fig. 2 by the vertical load P acting at one side, the carriage body will take up in accordance with the height of the load P a more or less inclined position as indicated in Fig. 2 as well. The load P may be constituted by a single person sitting within the carriage at the indicated side.

For preventing this taking up of the inclined position or for counterbalancing this load according to the invention means are to be provided acting upon one or all of the springs by changing their tension so that the one side load may be counterbalanced by a corresponding counter-force thus removing the inclination and restoring the normal position. In this way, even if the load P is still acting as indicated in Fig. 3 the carriage body comes back to its normal position or maintains it.

Fig. 4 shows schematically a side view of a motor-car provided with adjusting means according to the invention. The carriage body 10 is supported by the axles 12 by means of links 11. The springs named above are arranged in the form of torsion-rods 13 within the upper joints of the links 11, that will stay between the upper end of the links 11 and the carriage body 10. The details will be explained later on.

In the interior of the carriage body, in the neighbourhood of the driver's seat, a hand wheel 14 is pivoted, which by means of an intermediate gear 15 acts upon a shaft 16 arranged parallel to the longitudinal axis of the vehicle. This shaft 16 at its foremost end is provided with a worm 17 meshing with a worm wheel 18 keyed to the rear end of the torsion-rod 13. By turning the hand wheel 14 the tension of the torsion-rod 13 may be changed so that the one side load can be counterbalanced. A similar adjusting device may be arranged at the other side of the carriage body as well, or in connection with each of the four torsion rods 13 so that the tension of each of these springs can be adjusted to the desired or necessary amount.

From Figs. 5 and 6 it may be seen that the link 11 connected with the axles by joint 20 is provided with eyes 24 which like a fork embrace a projection 21 of the carriage body 10. The eyes 24 and the projection 21 are drilled out to receive a torsion-rod 13 which by means of a flattened part is keyed to the foremost eye 24 and secured by a nut 25. Thus the torsion-rod 13 is obliged to move with the link 11.

The torsion-rod 13 extends up to a forklike bearing 26 secured to the carriage body 10. At this end also a nut 27 is provided for preventing axial displacements of the torsion rod. Between the eyes of the bearing 26 a worm wheel 18 is keyed to the torsion-rod, and this worm wheel 18 meshes with a worm 17 arranged on a transverse shaft 28, the bearing of which is provided in the carriage body 10. This bearing can be made as a single piece together with the bearing 26. The worm gear 17, 18 can be covered by a housing not shown.

At the inner side of the carriage body 10 the transverse shaft 28 is provided with a bevel wheel 29 meshing with a further bevel wheel 30 keyed to a longitudinal shaft 16 extending at the innerside of the carriage body 10 and supported by suitable bearings. At the rearmost end, near the driver's seat, the shaft 16 carries a bevel wheel 31 meshing with a bevel gear 32 arranged in a vertical plane with respect to the wheel 31 and pivoted in a bearing of the carriage body 10. The wheels 31 and 32 form the gear 15 named above. The shaft 33 of the bevel wheel 32 further carries the hand wheel 14, and it will be clear that by turning this hand wheel 14 the tension of the torsion-rod 13 may be changed. If the vehicle is loaded at one side as shown in Fig. 2 the driver turns the hand wheel 14 and thus by means of the gear 15, shaft 16, bevel gears 30, 29 and the worm 17, which by means of the worm wheel 18 turns the torsion-rod 13 and correspondingly changes its tension so as to equalize the load and restore the normal position of the carriage body.

The same arrangement may be used if instead of torsion rods rubber springs subjected to torsional stress are used within the joints as indicated in Fig. 7. The link 11 is connected by a fork-like bearing 34 to the carriage body 10, and within the eye of the link 11 a sleeve 35 is tightly arranged supporting at its interior a rubber-bolt 36, which may be shaped by single discs as well, and which is vulcanized together with the sleeve so that these parts cannot move one with respect to the other. The central bore 37 of the bolt 36 has a rectangular or hexagonal cross section, and a bolt 38 of a corresponding cross section being inserted into this bore 37. At the rear end this bolt 38 carries a worm wheel 39 corresponding to the worm wheel 18 according to Figs. 5 and 6. The remaining gear parts of the construction according to Fig. 7 can be shaped and arranged in a similar manner as described in connection with Figs. 5 and 6, so that a turning of the hand wheel 14 causes a corresponding change of the tension of the rubber bolt 36 and consequently an equalizing of the load acting at one side only.

Even if torsion-rods or rubber springs as described above seem to be most suitable in connection with curve compensating vehicles, because they may be arranged in a simple manner and well protected within the joints, other spring systems can be used as well, e. g. helical springs arranged between the links and the carriage body and having the task to maintain the carriage body in its normal position respectively to restore the normal position if the carriage body had taken an inclined position.

Fig. 8 shows an arrangement with helical springs giving the possibility to adjust the tension of these springs with similar means as used in the constructions described above. The carriage body indicated by the tubes 40 is connected to the axles 43 by means composed of links 41 and 42. To the axles 43 guiding pieces 44 with special shaped slots 45 are secured, and in these slots 45 projecting arms 46 of the links 41 are guided. As this construction forms no part of the invention it seems not to be necessary to give further explanations in this respect.

The joints 47 connecting the links 41 with the carriage body 40 carry small lever arms 48 and 49 to the ends of which springs 50 and 51 respectively are attached. The spring ends directed to the centre line of the vehicle are connected to a block 52 the upper end of which being shaped to an eye 53 threaded at the inner side and arranged like a nut on a screw shaft 54 rotatably carried as at 56 by a transverse support 55 provided between the tubular frame bars 40. By suitable means, e. g. guideways, a turning of the eye-block round the axis of the shaft 54 is prevented, so that when turning the shaft 54 the block 52 moves in the direction of the axis of the shaft 54 to and fro, according to the direction of rotation. Thus the tension of the springs 50 and 51 may be varied to compensate for a one side load.

In order to turn the shaft 54 different means may be used. A suitable means will be a worm wheel 57 rigidly connected to the shaft 54, the worm wheel 57 meshing with a worm 58 rotatably carried in a suitable manner by the transverse support 55 and being connected to a shaft not shown but corresponding to the shaft 16 according to Figs. 5 and 6 and being provided at its rear end near the driver's seat with a hand wheel corresponding to the hand wheel 14 of Figs. 5 and 6. By turning this hand wheel shaft 54 will be turned as well thus changing the supporting points of the springs 50 and 51 and consequently the tension of these springs.

Figure 9:
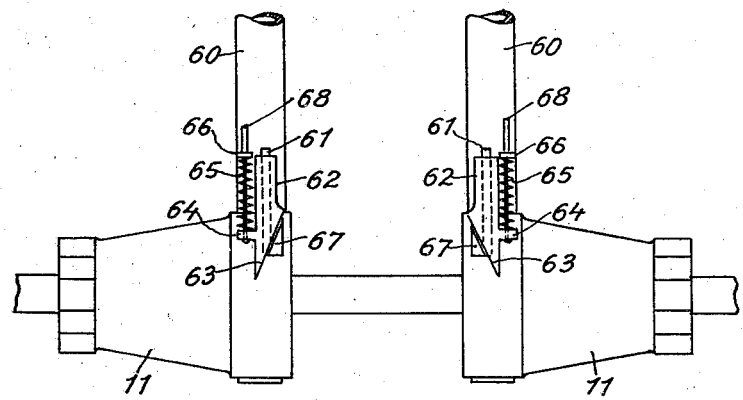
Fig. 9 shows a plan view of the locking device.
Figure 10:
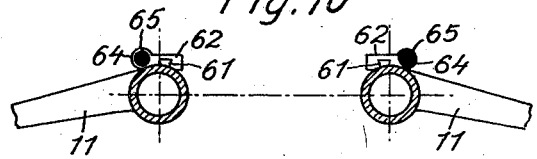
Fig. 10 shows a front view of Fig. 9.

Furthermore, for locking the carriage body in the normal or an inclined position or for giving a certain limitation to the inclination when travelling on curves the construction according to Figs. 9 and 10 may be used. The tubular frame bars 60 indicating the carriage body are provided at its upper side with guiding rails 61 extending longitudinally, and on each of these guide rails 61 a stop piece 62 is arranged slidably. The stop faces 63 of these stop pieces 62 are arranged obliquely with respect to the longitudinal axis of the vehicle. At the outer side each stop piece being provided with a projection 64 serving as a support of a spring 65, the other end of which being held by a projection 66 of the frame bar 60 so that the stop piece 62 by means of the spring 65 will be pressed always to the front into the direction to the oblique stop face 63.

The links 11 respectively 41 hinged to the frame bars 60 are provided each with a stop 67 having an obliquely directed stop face as well, which stop face may coact with the stop face 63 of the corresponding stop piece 62. By means of a wire, e. g. a Bowden-wire 68 one end of which being connected to the projection 64 and the other end of which being arranged near the driver's seat each of the stop pieces 62 may be retracted against the force of the spring 65 to any desired extent.

If now the stop pieces 62 are in the position shown in Fig. 9, their stop faces 63 being in contact with the corresponding stop faces of the stops 67, a motion that will say a turning of the links 11 or 41 with respect to the carriage body will not be possible. In common circumstances the wires 68 will be retracted by the driver so that by tensioning of the springs 65 the stop pieces will be retracted as well thus giving the possibility to the links 11 or 41 to turn with respect to the carriage body. If then a load will act on one side the carriage body will take up an inclined position. For preventing this before the load acts the driver may make advance the stop pieces 62 more or less by giving free the wires to a certain extent, so that the stop pieces 62 together with the stops 67 can limit the inclination to a corresponding degree.

A locking device of this kind may be arranged also in connection with the means for changing the tension of the springs as described above, and in Fig. 11 such a combination is shown however with the adjusting means in another construction than those indicated above.

The springs 50 and 51 provided between the links and the carriage body are indicated only schematically, and instead of the block 52 which according to Fig. 8 is moved by means of a screw shaft a bell crank lever 70 pivoted on the carriage body is indicated to the free end of which lever by means of a joint 71 a rod 72 being connected. The free end of this rod 72 carries, as will be explained more clearly later on, at a certain place a ball joint 73 which is connected by means of a curved lever 74 to a hand lever 75.

This hand lever 75 is shaped to a sleeve and carries at its under end two projections 76 provided with pins 77 forming the one pair of pins of a universal or Cardan joint, the other pair of pins 78 of which are rigidly connected to a hemispherical body 79 or a part of such a body. Both pairs of pins 77 and 78 are held together by rings 80. This universal joint may be arranged in the dash board 81 of the vehicle.

Within the sleeve-like hand lever 75 a rod 82 is guided, the upper end of which is bent outwardly within a widened part 83 of the hand lever. Pivotally connected to the outwardly bent end of the rod 82 is a transverse lever 84 rockably mounted in the widened part 83. To the other end of this lever 84 a further rod 85 bent outwardly as well is pivotally connected, and at the outer end of this rod 85 a knob 86 serving as a handle is arranged. By means of a spring this rod 85 will be always pressed out of the hand lever 75 whilst the rod 82 will be pressed out of the under end of the hand lever so that the end of this rod 82 will be inserted into one of the holes 87 formed in the hemispherical body 79.

Thus when pressing upon the knob 86 the rod 82 will be redrawn from the holes 87 so that now the lever 75 in view of the arrangement of the universal joint may be moved in any desired direction until by giving free the knob 86 the spring will force the rod 82 to reenter that of the holes 87 which corresponds to the position of the lever 75.

As indicated above the lever 75 being in connection by means of lever 74, joint 73 arranged in the axis of the universal joint, and rod 72 with the lever 71 and causes a rocking motion of this lever 71 thus changing the tension of the springs 50 and 51 to the desired degree.

In a plane at right angle to the plane of the lever 74 a similar lever provided with a ball joint corresponding to the joint 73 is arranged and connected to the hand lever 75. The joint of this second lever being in connection with a rod 88 carrying at its under end a rope pulley 89. Consequently if the lever 75 will be moved in a plane at right angle to the plane of the lever 74, the rope pulley 89 will be raised or lowered respectively moved forward and afterward, because the levers are arranged nearly horizontally and are parallel to the longitudinal axis of the vehicle.

A rope or wire 90 is laid around the pulley 89, and one end of the wire 90 is attached to one of the stop pieces 62 corresponding to the stop pieces of Fig. 9, whilst the other end of the wire 90 is guided by intermediate pulleys 91 and 92 and then attached to the other of the stop pieces 62.

Thus by moving the lever 75 in a plane at right angle to the plane of lever 74 the stop pieces 62 can be adjusted with respect to the corresponding stops 67, and in view of the fact that by moving the lever 75 in the plane of the lever 74 the tension of the springs 50 and 51 may be changed both adjustments can be made with a single lever.

If in the above description the adjusting and the locking device are indicated in connection with one spring respectively with one end of the vehicle only it will be selfunderstanding that these devices may be arranged at a plurality of springs or both ends of the vehicle, and that the special constructions and arrangements for these purposes are within the scope of the invention.

Having now described my invention what I claim is:

1. In a motor vehicle of the type in which the super-structure of the vehicle includes a body that is supported on an underframe through the medium of inclined links, wherein the links move transversely of the longitudinal axis of the vehicle, and wherein the distance between the points of connection of the links with the body is less than the distance between the points of connection of the links with the underframe so that the body of the vehicle will automatically assume an inclined position when travelling around road curves, springs for holding the body in a normal position of equilibrium and for returning the body to such position after the body has been moved to an inclined position by lateral forces, and means actuated interiorly of the vehicle and acting upon the springs to prevent the body from assuming an inclined position under the influence of a one side load.

2. In a motor vehicle of the type in which the super-structure of the vehicle includes a body that is supported on an underframe through the medium of inclined links, wherein the links move transversely of the longitudinal axis of the vehicle, and wherein the distance between the points of connection of the links with the body is less than the distance between the points of connection of the links with the underframe so that the body of the vehicle will automatically assume an inclined position when travelling around road curves, springs connected with the links for restoring the body of a normal position of equilibrium, said springs being in the form of torsion rods arranged within the joints of the connection between the links and body and gear mechanism in communication with the torsion rods and operable from the interior of the body to prevent the body from assuming an inclined position under the influence of a one side load.

3. In a motor vehicle of the type in which the super-structure of the vehicle includes a body that is supported on an underframe through the medium of inclined links, wherein the links move transversely of the longitudinal axis of the vehicle, and wherein the distance between the points of connection of the links with the body is less than the distance between the points of connection of the links with the underframe so that the body of the vehicle will automatically assume an inclined position when travelling around road curves, torsion rods extending longitudinally of the body and rigidly connected with an adjacent link, a coating worm and worm wheel associated with each torsion rod, a shaft on which the worm is mounted, a gear train in connection with the shaft, and a hand wheel adjacent the operator's seat for actuating the gear train to change the tension of the torsion rods so as to prevent the body from assuming an inclined position under the influence of a one side load.

4. A motor vehicle according to claim 3, characterized by the torsion rods comprising rubber bolts within the joints between the links and body.

5. In a motor vehicle of the type in which the super-structure of the vehicle includes a body that is supported on an underframe through the medium of inclined links, wherein the links move transversely of the longitudinal axis of the vehicle, and wherein the distance between the points of connection of the links with the body is less than the distance between the points of connection of the links with the underframe so that the body of the vehicle will automatically assume an inclined position when travelling around road curves, tensioned helical springs extending between the body and links, and means operable from the interior of the body for displacing the supporting points of the springs for changing the tension of the springs to prevent the body from assuming an inclined position under the influence of a one side load.

6. A motor vehicle according to claim 5, characterized by a shaft slidable on the body, a block slidably supported on the shaft with adjacent ends of the helical springs connected with the block, and the means operable from the interior of the body including a hand wheel with a gear train between the hand wheel and shaft.

7. In a motor vehicle of the type in which the super-structure of the vehicle includes a body that is supported on an underframe through the medium of inclined links, wherein the links move transversely of the longitudinal axis of the vehicle, and wherein the distance between the points of connection of the links with the body is less than the distance between the points of connection of the links with the underframe so that the body of the vehicle will automatically assume an inclined position when travelling around road curves, longitudinally slidable tensioned stop-pieces on the body adjacent the connection of the links with the body, means operable from the interior of the body for retracting the stop-pieces against tension thereon, and stops rigidly connected with the links and engaged by the stop-pieces on the body for preventing the body from assuming an inclined position under the influence of a one side load and for limiting the degree of inclination of the body relative to the underframe when travelling around road curves.

8. A motor vehicle according to claim 7, characterized by helical springs interposed between the links and body, a bell crank lever pivoted on the body and forming a support for one end of each of the springs, and the tension of the springs being adjusted by movement of the bell crank lever when the means operable interiorly of the body is actuated for retracting the stop-pieces.

JOACHIM KOLBE.